United States Patent [19]

Lois

[11] 4,313,713

[45] Feb. 2, 1982

[54] APPARATUS FOR IMPROVING THE PERFORMANCE OF A ROTATIONAL WIND ENERGY CONVERSION SYSTEM

[76] Inventor: Lambros Lois, 6104 Dunleer Ct., Bethesda, Md. 20034

[21] Appl. No.: 165,473

[22] Filed: Jul. 2, 1980

[51] Int. Cl.³ .............................................. F03D 11/02
[52] U.S. Cl. ...................................... 416/135; 416/11; 416/60; 416/170 R
[58] Field of Search ..................... 416/135 A, 137, 11, 416/133, 60, 170 A

[56] References Cited

U.S. PATENT DOCUMENTS

| 12,870 | 5/1855 | Peabody | 416/133 X |
|---|---|---|---|
| 14,143 | 1/1856 | Peabody | 416/133 |
| 756,616 | 4/1904 | Fornander | 416/60 X |
| 1,832,726 | 11/1931 | Newcomb | 416/60 |
| 2,484,291 | 10/1949 | Hays | 416/11 X |
| 3,924,827 | 12/1975 | Lois | 416/8 X |
| 4,076,190 | 2/1978 | Lois | 244/153 R |
| 4,180,369 | 12/1979 | Ottosen | 416/11 X |

FOREIGN PATENT DOCUMENTS

| 262685 | 7/1913 | Fed. Rep. of Germany | 416/133 |
|---|---|---|---|
| 455854 | 11/1928 | Fed. Rep. of Germany | 416/133 |
| 2722990 | 11/1978 | Fed. Rep. of Germany | 416/60 |
| 345761 | 12/1904 | France | 416/133 |
| 680891 | 5/1930 | France | 416/133 |
| 1078401 | 11/1954 | France | 416/11 |

*Primary Examiner*—Everette A. Powell, Jr.
*Attorney, Agent, or Firm*—Millen & White

[57] ABSTRACT

A system of coil springs of proper elastic constant(s) is attached on one end to the (horizontal or vertical) shaft of a wind energy conversion system and on the other end to the rotor, thereby forming a non-rigid connection between the two. The direction of the spring windings is such as to wind, in the relative motion of the rotor with respect to the shaft, in the direction of the rotor rotation. The system of springs generally consists of two or more sections each with an appropriate elastic constant. The spring sections are connected to each other through a rotating wheel with appropriate mass and mass distribution, so as to maximize the moment of inertia. A tube-like sleeve which rotates freely with respect to the shaft and the mass wheel, acts as a support for the rotor and the rotating mass. The system of springs and masses (inertia) improves the performance of a rotational wind energy conversion system in many ways, e.g., lowers stresses on hardware, increases and optimizes energy extraction from the wind, lowers the minimum wind velocity at which energy can begin to be obtained, minimizes effects due to resonant vibrations, etc.

10 Claims, 2 Drawing Figures

APPARATUS FOR IMPROVING THE PERFORMANCE OF A ROTATIONAL WIND ENERGY CONVERSION SYSTEM

BACKGROUND OF THE INVENTION

The present invention relates to an apparatus and method for improving the performance and efficiency of a rotational wind energy conversion system.

Such systems, best known to the public, e.g., as windmills, suffer from several disadvantages which contribute to the failure of the public to fully utilize them in energy conservation programs.

One inherent limitation involves the inability of the rotors to respond to the great number of variations in wind velocity (gusts) which are present at all times. In other words, the response time of the conventional windmills (when rotor and shaft are rigidly connected) is too slow to extract energy from the many wind gusts. In some instances, the control system requires that the rotor-shaft be rotating at constant or almost constant speed. Furthermore, as a result of this inability of the rotor to "follow" the wind gust velocity, the hardware constituting the windmill (rotor, shafts, supporting structures, etc.), is subjected to mechanical shock caused by the energy imparted to the rotor by the wind gusts. In some cases, these shocks can excite the resonant frequencies of the mechanical structure which can cause additional stresses thereon. Such phenomena can also be caused by the rotor blade crossing the supporting tower "wind shadow".

Another drawback is that such wind harnessing devices cannot begin to extract rotational energy from the wind until a minimum "cut-in" wind velocity is achieved, e.g., 8–10 mph.

As a result of these and other disadvantages, the amount of time which a wind energy conversion system is operational and the efficiency with which it operates during those times are such that the applicability of such systems has been relatively limited.

SUMMARY OF THE INVENTION

Accordingly, it is an object of this invention to provide a method and apparatus for improving the performance characteristics of a rotational wind energy conversion system, e.g., its on-time, cut-in velocity, efficiency, responsivity to wind gusts, susceptibility to stress due to gusting, etc.

Upon further study of the specification and appended claims, further objects and advantages of this invention will become apparent to those skilled in the art.

These objects have been achieved by this invention by providing a rotational wind energy conversion system comprising:

a rotor shaft connected at one end to the source of its rotational power when in operation, e.g., a wind-driven blade, a driven shaft connected at one end to a device which makes use of the rotational energy provided by said rotor shaft said rotor and driven shafts, at their other ends, being colinearly attached to one another by a coil spring and mass element system, said coil spring and mass element system comprising:

a series of at least two coil springs, each adjacent pair separated from each other by and connected to opposite sides of a generally circular wheel-shaped mass element which is not attached to the rotor or driven shafts, the ends of the terminal springs in the series which are not attached to one of said masses, being attached one to said rotor shaft and the other to said driven shaft, the configuration of said springs being such that they wind-up in response to the normal rotational motion of said rotor shaft.

BRIEF DESCRIPTION OF THE DRAWINGS

Various other objects, features and attendant advantages of the present invention will be more fully appreciated as the same become better understood when considered in conjunction with the accompanying drawings, in which like reference characters designate the same or similar parts throughout the several views, and wherein.

DETAILED DISCUSSION

Figure 1:
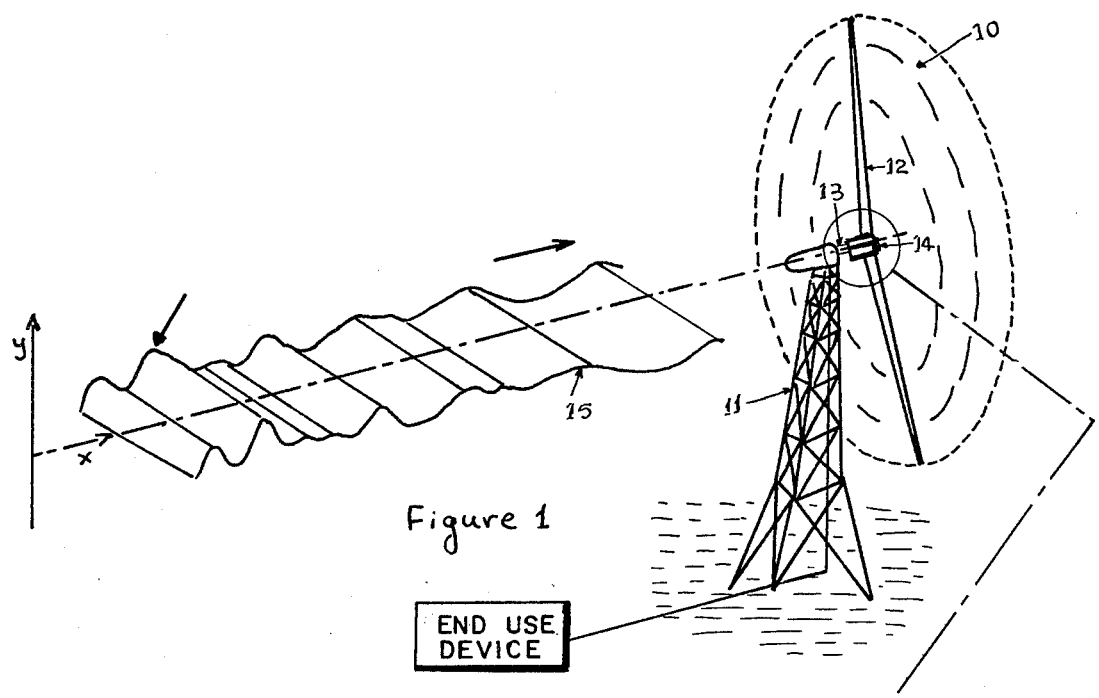
FIG. 1 illustrates the incorporation of the improvement of this invention in a conventional wind energy conversion system.

This invention relates to a system of coil springs and rotating masses which is interposed and forms the connection between the rotor shaft (driver) (hereinafter, rotor) and the follower shaft (driven) (hereinafter, shaft) of the energy conversion system. The system of springs is connected in such a manner as to wind, in a relative rotor-shaft motion, in the direction of the rotation of the rotor. When the spring is fully wound it forms a rigid connection of the rotor to the shaft in the direction of the rotation. The spring is preferably of compound design, i.e., is two or more springs, preferably of different elastic constants. Each spring could be of the same or variable cross-section.

There is a mass attached to the end of each spring component. The mass is connected to one spring on one side and the following spring on the other, unless that spring is a terminal one. In such cases, it will be connected to the rotor or to the shaft. The mass, e.g., a wheel, is free to rotate with respect to the shaft and the rotor and will rotate with the winding or unwinding of the springs to which it is attached. The wheel is of symmetric mass distribution with respect to the axis of the shafts. It has a mass and mass distribution to provide a moment of inertia appropriate to modify and complement the energy storage function of the springs.

The beneficial effects of incorporating the coil spring-mass system into a conventional rotational wind energy conversion system are great. It will lower the stresses developing in the rotor due to wind gusts which create pulses of torque on the rotor. The rotor is enabled to accelerate with respect to the motion of the shaft, wind the springs and accelerate the inertial masses. This allows the rotor to increase its efficiency compared to a rigid connection between rotor and shaft. The angular velocity of the shaft usually is constant or nearly constant due to load or load and control requirements. In other words, the response of the system to relatively fast changes in wind velocity is greatly heightened by interpositioning of the coil spring system. By choosing appropriately different spring constants for the various components, the response of the energy conversion system can be tailored to the particular use, the particular wind gust spectrum for which it is intended and the characteristics of the particular wind energy conversion system, e.g., mechanical and control design details, etc.

Similarly, the stresses developing on the supporting tower (horizontal axis machines) or the supporting structure (vertical axis machines) will be lowered insofar as these are due to the energy of the torque pulses imparted to the rotor from wind gusts. The gust energy is, instead, now stored temporarily in the springs and the rotating masses. Thus, the improvement of this invention acts as a temporary energy storage device for the energy contained in the wind gusts. This enables the rotor to better trace the wind velocity variations and thus extract more energy and improve efficiency.

A lower "cut-in" wind velocity will also be achieved by lowering of the torque required to initiate rotor rotation. This will permit the rotor to extract more energy from a given wind frequency distribution and thus further increase the total energy production of the rotor and the system.

Further, the need for a motor assisted starting of high speed low torque horizontal axis machines, and especially of vertical axis machines, will be eliminated. Similarly, the rotor caused excitation and resonance of the mechanical structure due to wind gusts or due to the rotor blade crossing the supporting tower "wind shadow" will also be eliminated.

A major source of the stresses which develop in the rotor of a wind energy generator are produced by the wind gusts which are ever present in wind flow. Wind gusts will produce a torque pulse on the rotor, tending to accelerate its rotation; however, due to load and/or control requirements, its rotational velocity is constant or nearly constant, hence producing stresses on the rotor and the rest of the system. A similar effect occurs when the rotor blades pass through the supporting tower "wind shadow" in a horizontal axis machine designed to operate downwind from the supporting tower. In such an arrangement, when the rotor blades enter the space behind the supporting tower where the wind velocity is very small or zero, the lift force which produces the torque on the rotor is absent. This unloading-loading sequence creates additional stresses on the rotor and the system.

In the arrangement of the present invention, the system of springs and the attached rotating masses acts as a temporary potential and kinetic energy storage device. In the case of a gust, the spring will wind up and allow the rotor to accelerate temporarily. This acceleration will allow the rotor to operate closer to the optimum velocity and thus extract more energy from the wind and increase its efficiency. The spring(s) and the accelerating mass(es) will absorb the extra energy of the gust and there will be a diminished or no torque impulse transmitted to the shaft, the rest of the system or the supporting structure.

The flow of the wind is not smooth; there is always present a certain amount of turbulence which is caused by obstructions on the flow path or by natural perturbation of the flow. It is easily shown that the power P present in an air mass moving with velocity V, per unit area perpendicular to the direction of motion, is proportional to the third power of the velocity, i.e., $P \sim V^3$. (The mass per unit time is, $m = 1 \cdot V \cdot \rho$, and its kinetic energy content is $(\frac{1}{2}) mV^2 = (\frac{1}{2})(V \cdot \rho) \cdot V^2 = (\frac{1}{2})\rho \cdot V^3$, i.e., the energy per unit time; hence $P \sim V^3$. See D. W. Adkins, "Dynamic Response of Power Generating Wind Turbines to Wind Speed Changes", Appendix 2; Thesis, University of Delaware, Department of Aerospace and Mechanical Engineering, June, 1977, whose disclosure is incorporated by reference herein. Because of this relationship, it is easily seen that even for a small increase in wind velocity for a short time during a wind gust, the energy content could be significant. For optimum energy extraction, it has been shown (Betz, A.: "Das maximum der theoretisch möglichen Ausnutzung des Windes durch Windmotoren", Zeitschrift für das gesampte Turbinenwesen 17–20, September 1920) that $\nu = u/V = \frac{1}{3}$, where V is the wind velocity at some distance from the rotor and u is the "cut-in" wind speed, i.e., the wind speed when it reaches the rotor. The angle of attack for each element of the rotor blade is designed to achieve a speed ratio, $\lambda_D = V/R\omega$, where R is the distance of the blade element from the axis of rotation and $\omega$ the angular velocity. To maintain $\nu = \frac{1}{3}$, when V increases, $\omega$ must correspondingly increase to maintain appropriate values of $\lambda_D$ and $\nu$. Therefore, for the most efficient operation during a gust, the rotor must be accelerated.

The presence of the spring system between the rotor and the shaft will allow this acceleration, thus (a) increasing the rotor efficiency, (b) storing the extra energy in the spring as potential energy and the rotating mass as kinetic energy, and (c) eliminating the torque impulse and the stresses it would generate on the rotor and the supporting structure. During the short periods when the blade passes through the "shadow" of the supporting tower, the potential energy of the springs and the kinetic energy of the rotating masses will maintain the velocity of the rotor, thereby avoiding transmission of an impulse to the load, the structure and the support.

During certain periods of time, the rotor will be at rest when the wind is calm or at low wind velocity. The wind velocity required to initiate rotation is relatively high for the following reasons: (a) the static coefficient of friction is usually higher than the moving coefficient of friction, i.e., when the rotor and the associated machinery are at rest, the initial torque required to put them in motion is higher than the torque needed to keep them rotating; and (b) the lift is relatively small and insufficient to initiate rotation of the wind conversion system under such conditions. The specific relationship between lift and the wind velocity (which defines the developing torque) depends on the specific foil profile design, cord length, etc. In general, high efficiency designs are low-torque, high-speed systems and their cut-in (start-up) is aided using a motor, usually the generator which acts as a motor when appropriately connected to a voltage grid. This problem (starting) is more acute in vertical axis machines, i.e., Darrieus wind conversion systems.

In the proposed design of the present invention, when the rotor is at rest, the springs are fully unwound and the required torque to initiate rotor motion is very small and dependent on the characteristics of the "weakest" spring which, of course, is suitably chosen to require much less torque than would be required by the rotor otherwise.

The spring-rotor system is capable of extracting more energy from the wind, storing it in the spring and the rotating masses and imparting a "kick-off" pulse to the shaft. In this manner, the cut-in velocity is lowered and the amount of energy extracted from a given wind conversion system operating in a given wind frequency pattern (depending on location) is increased. In many instances, rotor failure has been caused by resonance phenomena, i.e., amplification of oscillation at the characteristic frequency of the system. Excitation is provided by the frequency of the torque impulses due to wind gusts or by the passing of the rotor blades through the support tower "shadow". Via this invention, the mechanism and the structure of the wind energy conversion system are isolated from the torque impulses of the rotor by the interposed spring and rotating mass system.

Figure 2:
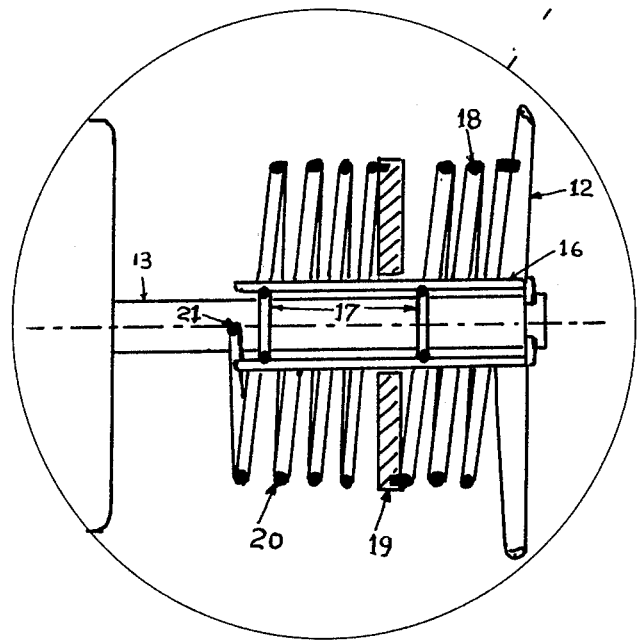
FIG. 2 depicts the details of one embodiment of the improvement of this invention.

Referring now to FIGS. 1 and 2, there are depicted a horizontal axis wind conversion system 10 and a one-dimensional wind gust pattern 15 consisting of several gusts. The variation of the wind velocity is shown in the direction of the positive y-axis, while the wind is moving in the direction of the positive x-axis. There is also shown an arrangement of a spring and mass system 14 which consists of two springs 18 and 20 and one rotating mass 19. One spring 18 is connected to the rotor 12 on one side and the rotating mass 19 on the other, while the second spring 20 is connected to the rotating mass 19 on one side and the shaft 13 on the other. The rotor system is supported in this case on a tower 11. The rotor 12 is connected to the shaft 13 through the system of springs and masses 14.

Assuming that the rotor is operating at a normal rotational speed, the springs are under tension, thereby transmitting the torque from the rotor to the shaft. The rotating mass 19 is also revolving with the same angular velocity as the rotor and the shaft. When a wind gust reaches the rotor it will impart to it a torque pulse. The rotor will tend to accelerate and will increase the tension on the springs. The springs will wind up to counteract the increased tension and will allow the rotor to accelerate momentarily, i.e., will enable it to follow the wind velocity pattern closer, and thus operate with an increased efficiency during the gust. During this acceleration phase, the rotating mass is also accelerated. When the gust has passed through, the rotor will decelerate; however, the mass will tend to maintain its increased angular velocity and increase the tension on the springs. This tension will be transmitted to the shaft on one side to which some energy will be imparted and to the rotor on the other side for which the deceleration will be smoother.

Via this mechanism, the stress-generating torque impulse from the gust is absorbed by the springs and the rotating mass, lessening its impact on the rotor, the structure and the supporting tower. In the case of a brief lull in the wind speed, either because the rotor blade enters the region behind the supporting tower or due to turbulence, the existing tension on the springs and the kinetic energy of the rotating mass will maintain the angular velocity and assure smooth transition in the brief period of absence of wind-generated torque on the rotor. The presence of the spring and mass system will eliminate the excitation and potential resonance phenomena in the system which originate with the gust impulses on the rotor or the rotor's passing behind the supporting tower.

When the rotor is at rest while the wind is calm, the springs are unwound and the mass is at rest with respect to the rotor and the shaft. Because the springs are unwound, the torque required to initiate rotation of the rotor is relatively small. The wind turbulence will impart an increased amount of energy on the rotor and will tend to put the mass in motion. The mass will initiate an oscillatory motion between the springs. At the same time, the rotor will tend to wind the springs due to torque impulses from wind gusts and torque from the low level wind present. When the mass rotation coincides with the rotor's, it will be possible to exert sufficient combined torque so as to put the system in motion. In this manner, the cut-in wind velocity will be lowered and the total energy extracted by a given wind energy conversion system, in a given location, will be increased. Similarly, the need for auxiliary means for starting will often be eliminated.

The precise characteristics of the spring and the mass connection means of this invention (e.g., the elastic constant of each spring, the length, diameter, weight and other characteristics of each, as well as the dimensions of each mass element and its mass and mass distribution, etc.), will be chosen in accordance with conventional physical principles and/or routine experiments in dependence on the particular characteristics of each rotational system, e.g., on the size of the rotor of a wind energy conversion system, its lift profile design, is characteristics of load and associated control means, the characteristics of the wind frequency spectrum for which it is to operate, the wind turbulence features for which it is designed to operate, etc. For example, the theory developed by D. W. Adkins, ibid and M. Hirschbein, "Dynamics and Control of Large Horizontal Axis Axisymmetric Wind Turbines" Doctoral Dissertation, University of Delaware, Department of Aerospace and Mechanical Eng., 1979, whose disclosure is incorporated by reference herein, can be used to determine such details.

For example, the characteristics of any specific system may be calculated using known physical principles and the final performance and operational specifications can be adjusted therefrom by simple routine experimentation where necessary. Without intending to limit this invention in any way, the following exemplary calculation is presented as merely illustrative.

To calculate an illustrative spring constant and moment of inertia of a rotating mass, the characteristics of the rotor system of Adkins (supra) is assumed. The rotor radius is 75 ft. (or 22.86 m). There are three blades, the linear mass of the blades being 200 lbm/ft and the moment of inertia $I = 8.44 \times 10^7$ ft$^2$·lbm. The design speed ratio $\lambda_o = V/R\omega$ is 0.125, where V=wind velocity=50 ft/sec, R=blade radius, and $\omega$ is the angular velocity. Then, $R\omega = 50/0.125 = 400$ ft/sec, and for R=75 ft., $\omega = 400/75 = 5.33$ sec$^{-1}$ = 320 min$^{-1}$, or $320/2\pi = 51$ rpm. The area of the rotor vertical to the wind velocity direction is $A = \pi R^2 = \pi(22.86)^2 = 1,641.7$ m$^2$. The power in this air motion is $P = (\frac{1}{2})$ mV$^2$, where m is the mass per unit time; hence, $P = (\frac{1}{2})A\rho V^3$, where $\rho$ = air density = 1.247 kg/m$^3$. $P = (\frac{1}{2}) \times 1,641.7 \times 1.247 \times (15.24)^3 = 3.623 \times 10^6$ m$^2$kg/sec$^3$. For conservative calculation, the theoretical efficiency is assumed, i.e., $\eta = 0.59$. Thus, the maximum possible power output is $P = 3.62 \times 0.59 \times 10^6 = 2.14 \times 10^6$ m$^2$·kg/sec$^3$ or P=2.14 MW. The amount of energy to be accommodated is about 30% of the normal energy rate for about 18 sec. This can be seen from the fact that for discrete gusts of considerable duration, the wind velocity above the mean is about 5 m/sec (W. Frost et al, "Engineering Handbook on the Atmospheric Environmental Guidelines for Use in Wind Turbine Generator Development", NASA Technical Paper 1359, December 1978). For a wind velocity of 50 ft/sec, i.e., 15.2 m/sec, 5 m/sec represents 30%. Hence, as shown later, the excess energy due to the gust is about 30%.

The total energy for 18 sec is $2.14 \times 10^6 \times 18 = 3.85 \times 10^7$ Joules, 30% of which is about $1.2 \times 10^7$ Joules. Dividing this energy equally between the potential energy of the springs and the kinetic energy of the masses, each should be able to accommodate $0.6 \times 10^7$ Joules. The additional angle to be traversed by the rotor will be $\Delta\theta = 51 \times 18/16 \times \frac{1}{2} \times 2\pi = 32$ radians. Then, the spring constant should satisfy: $E = \frac{1}{2}K(\Delta\theta)^2$ at that state of tension, i.e., $$K = \frac{2E}{(\Delta\theta)^2} = \frac{2 \times 0.6 \times 10^7}{(32)^2} \simeq 1.2 \times 10^4 \text{ Joules/radian} =$$

$$1.2 \times 10^3 \text{ kg.* m/rad.}$$

The kinetic energy of the rotating mass is $K = \frac{1}{2}I(\Delta\omega)^2$ where I is the moment of inertia and $\Delta\omega$ the difference in the angular velocity. $\Delta\omega = 32$ rad/18 sec = 1.8 rad/sec; hence $$I = \frac{2K}{(\Delta\omega)^2} = \frac{2 \times 0.6 \times 10^7}{(1.8)^2} \simeq 3.65 \times 10^6 \cdot J \cdot \sec^2 =$$

$$3.65 \times 10^6 \text{ kg} \cdot m^2$$

The essential features of the coil spring system of this invention reside in the use of two or more springs in conjunction with intermediate masses to connect the driving shaft with the driven shaft. Because, in general, at least two springs are involved, there is great latitude in designing the nature of the response of the rotor/shaft system of this invention to any given wind pattern. For example, the elastic constant of one spring may be chosen to achieve as low a cut-in velocity as is practical for a given design. The constant of the other spring may then be chosen to maximize the extraction of increased amounts of energy from wind gusts, i.e., to maximize the efficiency of energy conversion during operation. Of course, with a greater number of springs, the amount of energy which is storable in the system can be increased and/or the variation in elastic constants, and, hence, the ability of the system to respond efficiently to various wind conditions can be maximized. This end will also be achieved by proper selection of the characteristics of the interposed mass elements in accordance with the previously mentioned conventional physical principles. For example, for a given elastic constant and/or moment of inertia of a mass element, the wind velocities and velocity patterns, in conjunction with the particular rotor design involved, whose energy can most efficiently be extracted, can be readily determined. In this way, the system can be designed for maximum performance for any given rotational system in any given geographical region, i.e., wind pattern. Similarly, based on the same considerations, the characteristics of the mass elements can be chosen to optimize the amount of potential and kinetic energy which should be stored.

Any mechanical attaching technique can be used to connect the spring/mass system of this invention to a rotor and shaft as long as the end of the spring at one end of the system is connected to either the rotor or shaft and the remaining spring at the other end of the system is attached to the other of the two, and each of the mass elements is free to rotate with the springs independent of the rotor and shaft.

For example, as shown in FIG. 2, a tube-like sleeve connected directly to the rotor and surrounding the shaft may be employed. The sleeve can rest on bearings 17. To the sleeve 16 is attached the rightmost (as drawn) end of the coil system. The other end of the first spring component 18 is attached to the mass wheel 19. The rightmost end of the second spring component 20 is attached to the opposite side of the mass element 19. The remaining end of spring 20 is attached to shaft 13, e.g., via connection 21.

Other equivalent mechanical designs can be used, e.g., a tube-like sleeve which is attached directly to neither the shaft nor the rotor, but which rides on each via bearings. In this case, the mass element(s) can be attached directly to the rotating sleeve and the terminal springs attached appropriately to the rotor and shaft. Similarly, where appropriate, the springs and intermediate mass elements can be incorporated to attach a rotor to a shaft without the use of sleeve elements, e.g., by slipping the spring/mass complex over both the driven and driving shafts and attaching the terminal springs to each per the above.

At first sight, it might be wondered how an increase in energy extraction can be effected by the coil/mass system of this invention since, if the overall system is made to respond more closely to positive deviations of wind velocity from the average (i.e., gusts), it will also be made to respond more closely to negative deviations from the average, i.e., periods of time wherein the wind velocity is less than the average velocity to which the conventional rotor design is responding. However, as mentioned above, since the power is proportional to the third power of the velocity, the power increases due to higher velocities will produce a net increase in power even when considering the "losses" of power due to velocities less than the average. That is, since the power is not linearly related to the velocity, there will be no direct cancellation of the effects of the positive deviations in velocity due to corresponding negative deviations. Rather, the effect of the larger numbers involved in the increased velocities will be magnified with respect to the smaller numbers associated with the lower velocities since a cubic function is controlling.

To demonstrate this point, assume that a gust which lasts for a short time $\Delta t/2$ increases the wind velocity to $1.3 \cdot V$, where V is the average wind velocity, and that this is followed by an equal interval $\Delta t/2$ of diminished wind velocity of $0.7 \cdot V$ in such a way that the average remains unchanged, i.e., $$\frac{1.3 \cdot V \cdot \Delta t/2 + 0.7 \cdot V \cdot \Delta t/2}{\Delta t/2 + \Delta t/2} = V.$$

The wind energy available in the first interval is proportional to $(1.3V)^3 \cdot \Delta t/2$ and in the second $(0.7V)^3 \cdot \Delta t/2$. The total energy will be $1.27 \cdot V^3 \cdot \Delta t/2$. However, the average velocity V for an interval $\Delta t$ contains energy proportional to $V^3 \cdot \Delta t$. Hence, the gust increases the available energy by 27%.

In another embodiment of this invention, the mass wheels may be omitted where satisfactory results are thereby attained. In essence, the coil system of this invention is then constituted by springs only, i.e., at least two springs, at least two of which have different elastic constants. For example, this may be achieved by direct interconnection of the springs or by connection of the same via mass elements as described above except having essentially negligible mass.

Without further elaboration, it is believed that one skilled in the art can, using the preceding description, utilize the present invention to its fullest extent. From the foregoing description, one skilled in the art can easily ascertain the essential characteristics of this invention, and without departing from the spirit and scope thereof, can make various changes and modifications of the invention to adapt it to various usages and conditions, e.g., using equivalent mass elements of varying shapes, or other attachment means of essentially the same function, etc.

What is claimed is:

1. A rotational energy conversion system comprising,
a wind drivable blade which rotates in response to wind forces,
a rotor shaft having one end connected to said wind driven blade, such that under the influence of wind forces, the blade rotation is about an axis coinciding with said rotor shaft, causing said rotor shaft to rotate in the same direction, and
a driven shaft connectable at one end to an end device which makes use of rotational energy transmitted by said driven shaft,
said rotor and driven shafts, at their other ends, being attached to one another by a coil spring and mass element system, such that, under the influence of wind forces, said driven shaft will be caused to rotate in the same direction as said rotor shaft,
said coil spring and mass element system comprising,
a series of at least two coil springs, the first and last of which are terminal springs, each adjacent pair separated from each other by and connected to opposite sides of a generally circular wheel-shaped mass element which is not attached to the rotor or driven shafts, the ends of the terminal springs which are not attached to one of said masses, being attached one to said rotor shaft and the other to said driven shaft, the configuration of said springs being such that they wind up in response to the normal rotational motion of said rotor shaft in response to wind forces.

2. The rotational wind energy conversion system of claim 1, wherein said rotor shaft comprises a colinear sleeve-like tube which is colinearly disposed around said driven shaft and rides thereon by means of roller bearings; said coil spring and mass element system is disposed around said sleeve; and one terminal spring of said coil spring and mass element system is attached to said sleeve-like tube and the other terminal spring is attached to said driven shaft.

3. The rotational wind energy conversion system of claim 1, wherein at least two of said coil springs have elastic constants which are different from each other.

4. The rotational wind energy conversion system of claim 1, wherein the weight of said mass elements is negligible, thereby providing a system essentially of springs only, at least two of which have different elastic constants.

5. The rotational wind energy conversion system of claim 1, which is a horizontal axis device.

6. The rotational wind energy conversion system of claim 1, which is a vertical axis device.

7. The rotational wind energy conversion system of claim 5, further comprising a tower on which is horizontally mounted said rotor and driven shafts.

8. The rotational wind energy conversion system of claim 1, wherein the end use device is an electric generator or a pump.

9. The rotational wind energy conversion system of claim 1 or 7 further comprising an end use device which makes use of rotational energy and which is connected to the end of said driven shaft which is not connected to said coil spring and mass element system.

10. A rotational energy conversion system comprising:
a wind drivable blade which rotates in response to wind forces, and
connection means attached at one end thereof to said blade and attachable at its other end to an end device which makes use of rotational energy transmitted by said rotatable blade through said connection means,
said connection means comprising at least two coil springs having different elastic constants, each adjacent pair being directly or indirectly connected to each other, and the ends of the terminal springs which are not attached to another spring being attached one, directly or indirectly, to said blade and the other, directly or indirectly, to said end device, the configuration of said springs being such that they wind up in response to the normal rotational motion of said blade in response to wind forces.

* * * * *